United States Patent [19]

Quenneville

[11] 4,214,652
[45] Jul. 29, 1980

[54] VARIABLE POWER TRANSMISSION AND ABSORPTION DEVICE

[75] Inventor: Raymond N. Quenneville, Suffield, Conn.

[73] Assignee: The Jacobs Manufacturing Company, Bloomfield, Conn.

[21] Appl. No.: 965,424

[22] Filed: Dec. 1, 1978

[51] Int. Cl.² ............................................. F16D 31/00
[52] U.S. Cl. ................................. 192/58 R; 192/61; 192/82 T; 123/41.12; 188/292; 60/456
[58] Field of Search ..................... 192/58 R, 61, 82 T; 418/166, 171, 191, 54, 133; 188/264 B, 264 P, 292, 293, 295; 123/41.12; 60/329, 456, 494

[56] References Cited

U.S. PATENT DOCUMENTS

| | | | |
|---|---|---|---|
| Re. 22,577 | 12/1944 | Thomas | 192/61 |
| 864,724 | 8/1907 | Brown | 192/61 |
| 1,636,486 | 7/1927 | Planche | 418/117 X |
| 1,883,685 | 10/1932 | Gasterstadt | 192/61 |
| 1,935,400 | 11/1933 | Junkers | 192/61 |
| 2,011,338 | 8/1935 | Hill | 418/171 X |
| 2,076,664 | 4/1937 | Nichols | 418/95 |
| 2,484,913 | 10/1949 | Snell | 192/12 |
| 2,526,914 | 10/1950 | Thomas | 192/61 |
| 2,531,014 | 11/1950 | Thomas | 192/61 |
| 2,704,141 | 3/1955 | Doshier | 192/61 |
| 2,818,023 | 12/1957 | Lundstrom | 418/200 |
| 2,915,982 | 12/1959 | Crandall | 418/133 |
| 3,118,387 | 1/1964 | Aldrich | 418/32 |
| 3,179,221 | 4/1965 | Weir | 192/58 B |
| 3,184,021 | 5/1965 | Alleman | 192/58 R |
| 3,207,279 | 9/1965 | Ahlen | 192/57 |
| 3,252,554 | 5/1966 | Baier | 192/61 |
| 3,275,114 | 9/1966 | Thomas | 192/61 |
| 3,303,724 | 2/1967 | Reeves, Jr. | 74/687 |
| 3,327,477 | 6/1967 | Stageberg | 60/327 |
| 3,444,969 | 5/1969 | Berklege | 192/61 |
| 3,497,045 | 2/1970 | Hannes | 192/61 |
| 3,623,829 | 11/1971 | Shaw et al. | 418/171 |
| 3,696,896 | 11/1971 | Hamilton | 192/3.28 |
| 3,841,451 | 10/1974 | Saylor et al. | 192/58 B |
| 3,907,084 | 9/1975 | Hall | 192/58 B |
| 3,974,900 | 8/1976 | Park | 192/61 |
| 4,007,819 | 2/1977 | Maci | 192/58 B |
| 4,065,052 | 12/1977 | Ridenour | 192/82 T X |

Primary Examiner—Edgar W. Geoghegan
Attorney, Agent, or Firm—Donald E. Degling

[57] ABSTRACT

An apparatus is provided which is adapted to deliver or absorb variable amounts of torque or to deliver variable quantities of an incompressible fluid at a predetermined pressure. The device comprises a positive displacement pump capable of pumping a compressible fluid, an incompressible fluid or a mixture of a compressible fluid and an incompressible fluid together with appropriate pressure control and flow control mechanisms, check valve mechanisms and interconnecting duct means.

37 Claims, 14 Drawing Figures

VARIABLE POWER TRANSMISSION AND ABSORPTION DEVICE

BACKGROUND OF THE INVENTION

1. Field of the Invention

This invention relates generally to the field of mechanisms adapted to transmit or absorb power and more particularly to devices adapted to transmit or absorb variable amounts of power by delivering an incompressible fluid in varying quantities within a range of quantities and devices adapted to deliver a variable quantity of an incompressible fluid at a desired pressure.

2. Prior Art

In connection with the operation of vehicles, particularly commercial vehicles powered by internal combustion engines, a number of problems are presented with respect to engine cooling, to the supply of variable quantities of incompressible fluids, such as lubricating oil, and to the efficient braking of the vehicle of accessory loads driven by the engine.

Considering first the problem of engine cooling, it has long been common to provide a heat exchanger in the form of a radiator comprising finned tubes through which air may be passed to dissipate heat from an engine cooling system or oil cooling system. It is also common to provide a fan, normally driven directly or by a belt from the engine crankshaft, to induce a flow of air through the radiator. Such a fan consumes a substantial amount of power, the quantity of power being a function of the rotational speed at which the fan is driven. In the case of a fan driven directly by a vehicle engine it is apparent that the speed of the fan will be proportional to the engine speed. During operation over the highway, the vehicle speed will also generally be proportional to the engine speed (for any particular gear ratio). However, as the vehicle speed increases, the ram effect of the vehicle will increase the flow of air through the radiator and the requirement for the fan decreases. Thus it is apparent that much of the power delivered to drive the fan of a vehicle engine may be wasted during normal operation of the vehicle. Since such a fan may consume upwards of 20 or 25 horsepower, the quantity of energy involved is significant. Accordingly, it is an object of the present invention to provide a variable power fan drive in which the power or torque supplied to the fan is varied to meet the actual cooling requirements of the engine. In another aspect of the invention, a control means is provided whereby the power delivered to the fan through the fan drive is limited to be only slightly greater than that required to drive the fan at whatever speed the fan may be operating. Thus the fan may be accelerated smoothly to the required operating speed. A still further aspect of the invention involves the limitation of the torque to a predetermined maximum value.

Turning next to the problem of supplying fluids, such as oil, to a vehicle engine or its auxiliaries, it is common to utilize mechanisms such as positive displacement gear pumps to provide a supply of engine lubricating oil to lubricate the engine or drive auxiliaries such as hydraulic lifts or power take-off devices. Again, where the gear pump is directly driven from the engine, the quantity of the oil supplied varies with the speed of the engine. In order to provide a sufficient quantity of oil to meet the engine or accessory requirements at low speeds, the gear pump must be designed so that excess quantities of pressurized oil are provided when the engine is operated at normal or high speeds. Such excess quantities of pressurized oil are frequently by-passed back to a sump so that a substantial amount of energy is wasted in pumping the oil through the oil pressurizing system. It is therefore another object of the present invention to provide a mechanism capable of supplying an incompressible fluid at any desired flow rate whereby the energy required for pumping and pressurizing the fluid is limited to the actual needs of the system.

Finally, it is well known that large commercial vehicles operating at normal highway speeds possess a very large momentum and that it is difficult to brake such vehicles using the ordinary drum or disc-type friction brakes without unduly shortening the life of such drum or disc brakes. As a partial solution for adequate braking, it is common for such vehicles to utilize the compression braking power of the engine by operating the vehicle in a lower gear during descent of long hills. In addition, many commercial vehicles are provided with engine retarders which make more effective use of the engine compression by opening the engine exhaust valves out of the normal sequence whereby the energy required to compress air in the engine cylinders is not recovered in the subsequent expansion stroke of the engine. Additionally, such vehicles may be provided with exhaust brakes which increase the exhaust manifold pressure. Another device which has been used is the electrodynamic brake by which the mechanical energy of the vehicle is transformed into electrical energy which is dissipated through resistance elements. In accordance with another aspect of the present invention, a mechanical device is provided wherein a variable ratio of compressible and incompressible fluids is introduced into the device and whereby the power absorbed by the device is a function of the proportion of the incompressible fluid passing through the device. In this manner the device of the present invention functions as a power absorbing or braking or retarding device to provide a primary or auxiliary source of braking power.

While the primary utility of the device lies in its application to commercial vehicles, it will be appreciated that the device is also applicable to stationary engines or to rotating equipment such as turbines or blowers which may require a braking function, a power transmission function, or a variable supply of an incompressible fluid such as fuel or oil.

SUMMARY OF THE INVENTION

In its broadest aspect, the present invention comprises a positive displacement pump device such as a gear pump including an external and internal gear, a vane pump or piston pump capable of doing work on a compressible fluid and recovering substantially all of such work during an expansion cycle while simultaneously pumping a variable quantity of an incompressible fluid such as hydraulic or lubricating oil or fuel together with means to control the input and output of the incompressible fluid as a function of engine temperature or machine speed together with appropriate check valves, control valves and auxiliary devices. As a fan drive or torque transmission device, the device comprises a positive displacement pump designed to pump air and a variable quantity of oil wherein the quantity of oil is controlled by a thermostatic valve and, optionally, the pressure of the oil is limited by a pressure relief or centrifugally controlled valve. As a variable displacement pump, the device comprises a positive displacement pump designed to pump a compressible fluid such as air together with a variable quantity of an incompressible fluid such as oil or fuel in conjunction with a series of check valves, control valves and auxiliary equipment. As a brake or torque absorbing device, the device comprises a positive displacement pump designed to operate on a compressible fluid such as air and a variable quantity of an incompressible fluid such as oil together with a control valve system to control the input flow of the oil and the output pressure of the oil whereby the power consumed by the device may be varied as desired.

Further objects and advantages of the invention will be set forth in the following detailed description of the invention and the drawings.

DETAILED DESCRIPTION OF THE DRAWINGS

DETAILED DESCRIPTION OF THE INVENTION

Figure 3:
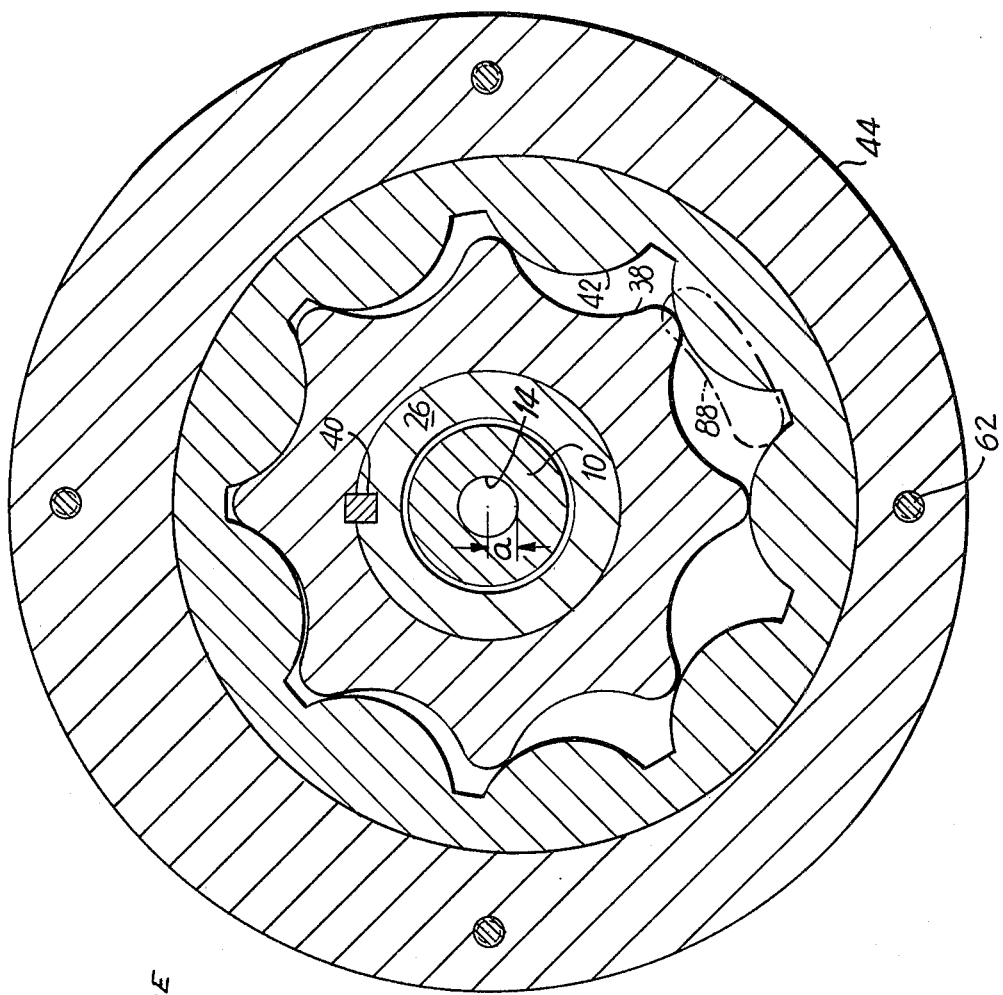
FIG. 3 is a cross-sectional view taken along line 3—3 of FIG. 2.
Figure 1:
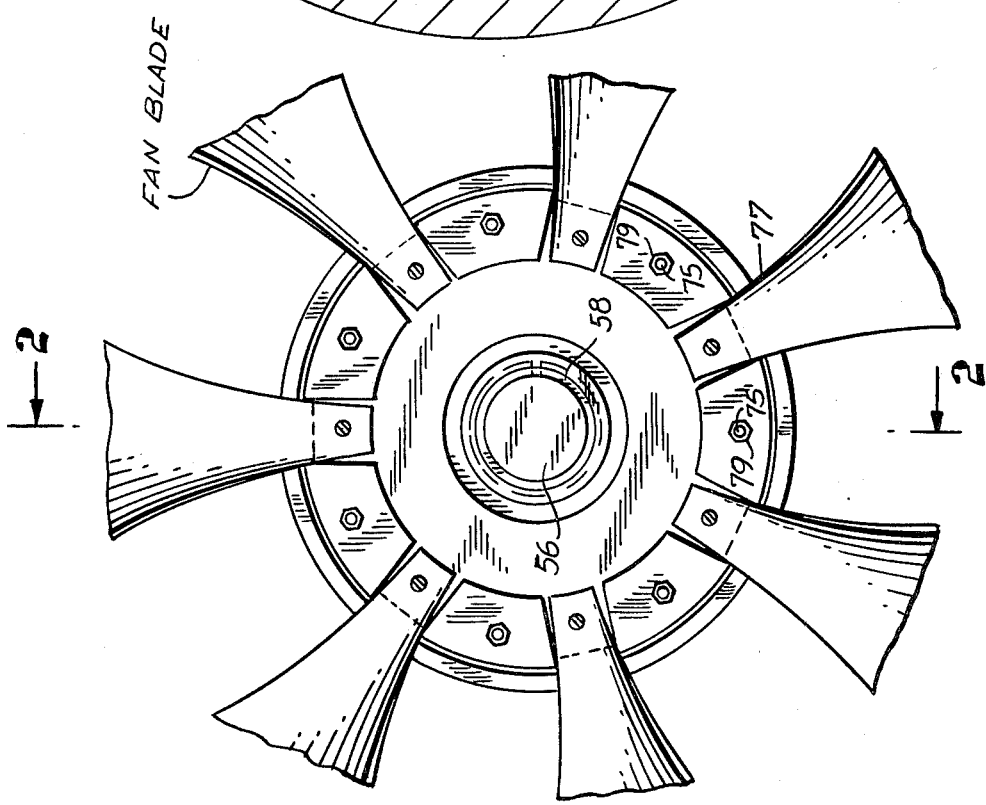
FIG. 1 is a fragmentary end elevational view of a torque transmitting device comprising a fan drive in accordance with the present invention.
Figure 2:
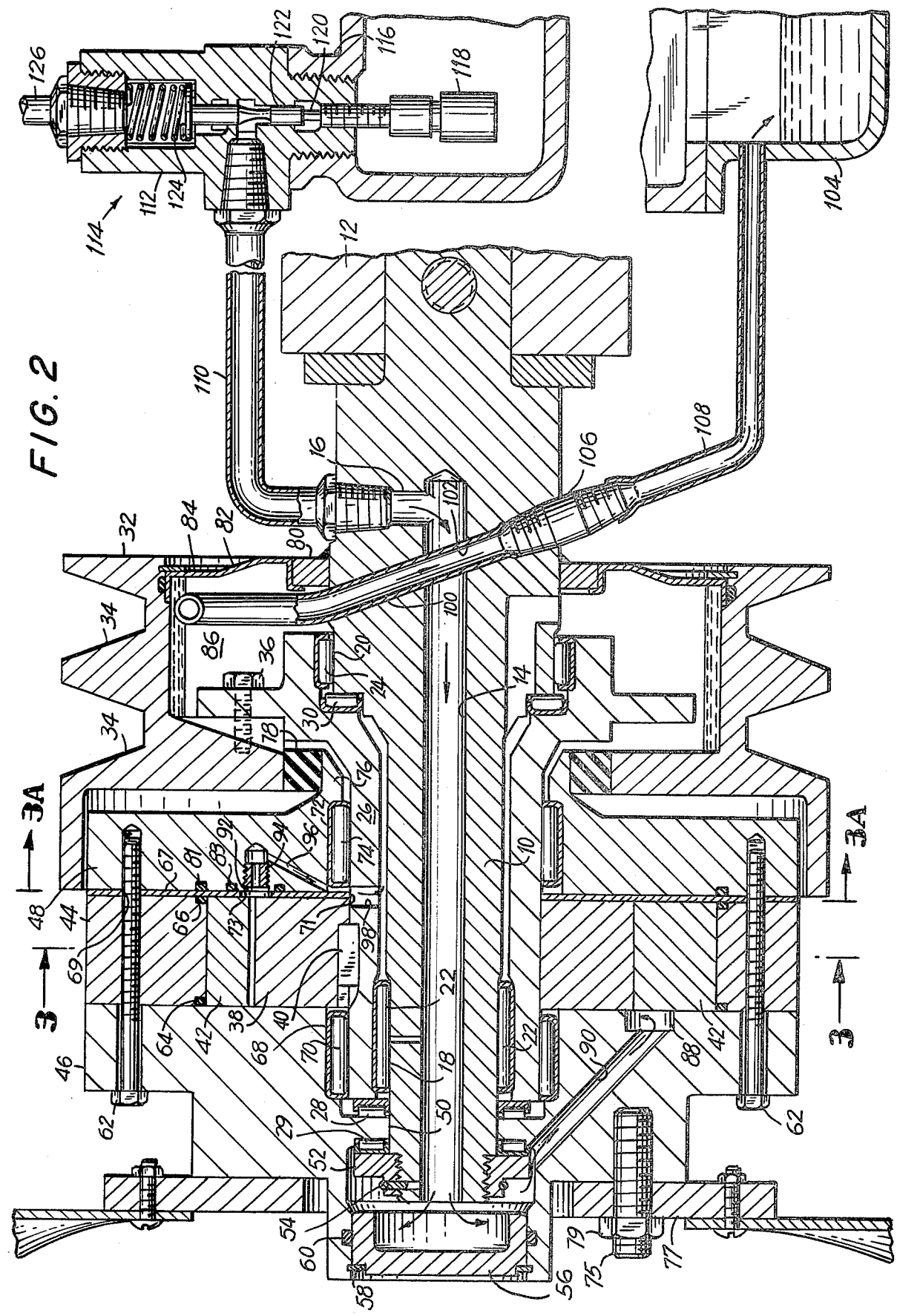
FIG. 2 is a schematic view taken along line 2—2 of FIG. 1 of the device of the present invention showing its application as a torque transmitting device comprising a fan drive in conjunction with an internal combustion engine; and incorporating a positive displacement pump having an internal and external gear and associated control means.

Referring now to FIGS. 1-3 which illustrate a fan drive for an internal combustion engine in accordance with the present invention, the numeral 10 represents a stationary cylindrical shaft structure affixed to the block 12 of an internal combustion engine. An axial bore 14 is formed in the stationary shaft 10 extending from the outward end of the shaft but terminating short of the inward end of the shaft. The axial bore 14 communicates with an internally threaded radial bore 16 near the inner end of the bore 14 thus forming a passageway through the shaft 10. Bearing raceways 18 and 20 are formed on the outer surface of the shaft 10 to accommodate needle bearings 22 and 24. A pulley support 26 is mounted for rotational movement relative to the shaft 10 on the needle bearings 22, 24. Axial movement of the pulley support 26 relative to the shaft 10 is controlled by the thrust bearings 28, 30. A drive pulley 32 having external V-belt guide grooves 34 is fastened to the pulley support 26 by a plurality of bolts 36 whereby the pulley 32 is rotatable with the pulley support 26 about the stationary shaft 10.

An external gear 38 is keyed to the pulley support 26 by a key 40 (FIG. 3) so as to be constrained to rotate with the pulley support 26 about the axis of the stationary shaft 10. The external gear 38 meshes with an internal gear 42 mounted eccentrically with respect to the axis of the external gear 38 and having at least one more tooth than the external gear 38. As appears most clearly in FIG. 3, the external gear is provided, for example, with eight teeth while the internal gear has nine teeth and the axis of rotation of the internal gear 42 is offset a distance "a" from the axis of rotation of the external gear 38. It will be appreciated that the precise number of teeth on the external gear 38 and the thickness of the gear elements are a matter of design choice depending upon the particular application. However, in this form of a positive displacement pump, the internal gear has at least one more tooth than the external gear. The internal gear 42 is journalled for free rotation within an eccentric ring 44 having its internal bore offset from its external diameter by a distance "a" (FIG. 3). Thus, the outside diameter of the eccentric ring 44 is concentric with the axis of the stationary shaft 10. The gears 38 and 42 and the eccentric ring 44 are maintained in juxtaposition by an outer flange 46 and an inner flange 48. Outer flange 46 is provided with an annular rib 50 having an aperture formed therein through which the stationary shaft extends and having raceways formed thereon to cooperate with thrust bearings 28 and 29. The outer flange 46 is restrained axially with respect to the stationary shaft 10 by a nut 52 and appropriate locking means 54. The outer flange 46 is closed by a cap 56 fastened to the outer flange 46 by a lock ring 58. Leakage of oil between the cap 56 and outer flange 46 is prevented by an O-ring 60 seated in the bore of the outer flange.

The outer flange 46, eccentric ring 44 and inner flange 48 are secured together by a plurality of circumferentially disposed bolts 62. An oil-tight seal between the outer flange 46 and the eccentric ring 44 and between the eccentric ring 44 and the inner flange 48, respectively, is provided by O-rings 64 and 66 when the optional pressure plate 67 and O-rings 81 and 83, described in more detail below, are omitted. An annular groove 68 is formed in the outer flange 46 to receive a needle bearing 70 which maintains rolling contact with the pulley support 26. Similarly, the inner flange 48 is provided with an annular groove 72 which carries a needle bearing 74 which also maintains rolling contact with the pulley support 26. A plurality of studs 75 are threaded into the outer flange 46 to provide a mounting means for an appropriate multi-bladed fan 77. The fan 77 is secured to the studs 75 by a plurality of nuts 79. It will be appreciated that the outer flange 46, inner flange 48, eccentric ring 44 and fan 77 are mounted for rotation with respect to both the pulley support 26 and stationary shaft 10.

An annular lip 76 formed on the inner side of the inner flange 48 carries a seal 78 which forms an oil-tight seal between the inner flange 48 and the pulley 32. A second seal 80 is located on the stationary shaft 10 in the plane of the inner edge of the pulley 32. Seal 80 cooperates with an annular cover plate 82 and a locking ring 84 to provide an oil-tight seal between the outer edge of the pulley 32 and the stationary shaft 10. As shown in FIG. 2, an annular cavity 86 is defined by the shaft 10, pulley support 26, pulley 32, the seals 78, 80 and the cover plate 82.

An inlet port 88 having a radial dimension approximately equal to the depth of the teeth of the internal gear 42 is formed in the inner surface of the outer flange 46 in the locus of the path of the teeth of the internal gear. The inlet port 88 communicates through a passageway 90 with the aperture in the outer flange 46 and then to the axial bore 14 of the stationary shaft 10.

An outlet port 92 is formed in the outer face of the inner flange 48 diametrically opposed to the inlet port 88. The outlet port 92 is positioned radially in the locus of the path of the teeth of the internal gear 42. Preferably, a restricted orifice 94 is positioned in the outlet port 92 to control the flow of oil therethrough. A passageway 96 communicates between the outlet port 92 and the annular groove 72 in the inner flange 48. A plurality of radial ports 98 may be formed in the pulley support 26 in the plane of the outer face of the inner flange 48.

A transverse passageway 100 is formed in the stationary shaft 10 to communicate between the annular cavity 86 within the pulley 32 and the surface of the shaft 10 outside the pulley 32. A pitot tube 102 is positioned within the passageway 100 and extends into the annular cavity 86 with its open end adjacent the rim of the pulley 32 and facing in a tangential direction opposite to the direction of rotation of the pulley 32. The pitot tube 102 communicates with a sump such as the engine crankcase 104 through a fitting 106 and tube 108. It will be appreciated that there is no direct interconnection or communication between the pitot tube 102 and the axial bore 14 of the shaft 10.

A tube 110 communicates between the threaded bore 16 and the body 112 of a thermostatic valve 114. The body 112 is threaded into the cooling jacket 116 of the internal combustion engine so that the thermostatic element 118 is in contact with, and responsive to, the temperature of the engine coolant. It will be appreciated that the actuator 120 of the thermostatic element 118 will move in an axial direction in response to changes in the temperature of the engine coolant. Such motion will move the control spool 122 against the force of a spring 124 so as to control the flow of oil from a low pressure inlet duct 126, which communicates at one end with a sump such as the crankcase 104, and at the other end through the body 112 of the thermostatic valve 114 and into the tube 110.

The operation of the invention as illustrated in FIGS. 1-3 will now be described. When the internal combustion engine is operating, the drive pulley 32 and pulley support 26 will rotate as they are connected by an appropriate V-belt (not shown) to the engine crankshaft or other driving element (not shown). The pulley support 26 will, in turn, rotate the external gear 38 to which it is keyed. Upon an increase in the temperature of the engine coolant, the thermostatic element 118 will cause the actuator 120 to move the control spool 122 of the thermostatic valve 114 to permit the flow of low pressure lubricating or engine oil from a sump such as the crankcase 104 through the low pressure supply (not shown) and low pressure duct 126 into the tube 110, the radial bore 16, the axial bore 14, the passageway 90 and the low pressure inlet 88.

Referring now to FIG. 3, the design of the internal and external gears is such that line contact is maintained between the respective teeth of the gears and thus a series of cavities is formed, defined by the surface of the gear teeth and the adjacent faces of the inner flange 48 and the outer flange 46. It will be understood that as the gears rotate in a clockwise direction as viewed in FIG. 3, the cavity decreases in size as it moves from the region of the inlet port 88 to the region of the outlet port 92. After reaching a minimum size in the region of the outlet port 92, the cavity increases in size until it again attains a maximum size in the region of the inlet port 88. If it be assumed that only a compressible fluid, such as air, is introduced at the inlet port and that the outlet port is closed, then the fluid will be compressed as the cavity moves from the inlet to the outlet port and expanded as the cavity moves from the outlet to the inlet port. Very little energy will be consumed in such a process since the energy required to compress the compressible fluid will be recovered during the expansion portion of the process. Of course, a small amount of energy will be lost due to friction.

If a small amount of an incompressible fluid, such as oil, is introduced at the inlet port 88, the oil will be delivered at high pressure (along with a portion of the air) at the outlet port 92 and through the passageway 96 to the bearings 74 and the ports 98. The oil passing through the ports 98 will be directed through the several bearings 22, 24, 28, 30 and 70 and thence into the cavity 86 of the drive pulley 32, thereby effectively lubricating each of these bearings. Oil passing through bearing 74 goes directly to the cavity 86. As a result of the rotation of the drive pulley 32, a centrifugal force is applied to the oil in the cavity 86 causing it to form into a layer of substantially uniform depth adjacent the rim of the pulley. When the layer of oil attains a sufficient depth, it will enter the open end of the pitot tube 102 and be conducted back to the sump or engine crankcase 104 through the tube 108. In order to provide positive lubrication and cooling of the fan drive mechanism, it is desirable to design the thermostatic valve 114 so that the control spool 122 never operates to cut off all flow of oil through the valve 114. So long as the quantity of oil supplied to the system through the thermostatic valve 114 does not exceed the quantity which can be exhausted through the orifice 94, the external gear 38 will drive the internal gear 42 which will turn freely about its own axis offset by the distance "a" from the axis of the external gear. The gear 42 will therefore also rotate freely within the eccentric ring 44 and apply essentially no driving torque to the eccentric ring 44 and the flanges 46, 48 and fan 77 connected thereto. This mode of operation may be described as an "over running" mode and is automatically called into effect when the engine coolant is at or below the desired operating temperature.

Figure 4:
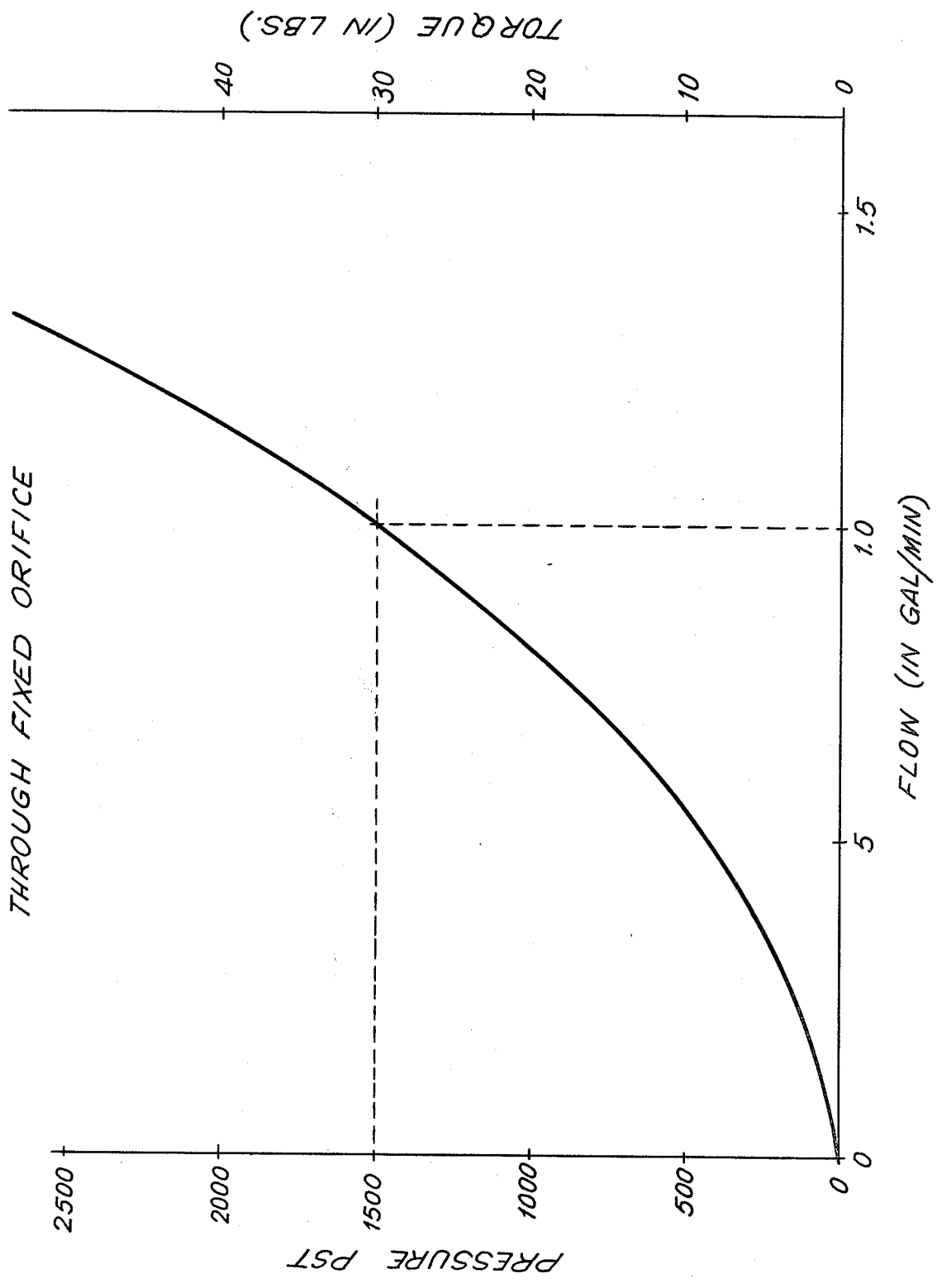
FIG. 4 is a typical graph showing the relationship between oil flow, oil pressure and torque transmitted by the device shown in FIGS. 1-3.

FIG. 4 is a graph showing the relationship between oil input flow and outlet pressure for the fan drive device of FIGS. 1-3. As an increasing amount of oil is introduced into the inlet port 88, the quantity of air in the pump cavity is decreased and the pressure in the outlet region increases. Of course, as the outlet pressure increases, the flow through the orifice 94 will increase somewhat until an equilibrium condition is attained. However, since the effective tooth working area exposed to the pressure in the cavities between the gear teeth is essentially constant, the output torque is directly proportional to the pressure produced by the mechanism. The output torque is transmitted through the device by the pressure developed in the cavity which resists the normal meshing of the internal and external gears 42, 38 and decreases the speed of rotation of the internal gear 42 about its eccentric axis. Gear 42 thus functions as a crankshaft and drives the eccentric ring 44 and its associated elements, including the fan. It will be appreciated from FIG. 4 that the pressure, and therefore the torque, transmitted by the apparatus of the present invention, may be controlled by controlling the amount of oil introduced into the apparatus. In the present embodiment, the oil flow is controlled by the thermostatic valve 114 as a function of the temperature of the engine coolant. Thus, whenever increased cooling is required, whether as a result of low vehicle speeds, higher engine loads or increased ambient temperature, the drive according to the present invention will be effective to supply a torque to the fan which will increase the fan speed. Similarly, as the engine cooling requirements decrease so also will the torque applied to the fan decrease. Thus, the rotational speed of the fan will be controlled automatically to consume only the amount of power required for cooling the engine. This mode of operation may be termed an "intermediate speed" mode since the output speed varies with the oil flow and pressure.

The upper limit of the "intermediate speed" mode is known as the "full drive" mode. This mode occurs when the amount of oil delivered to the inlet port 88 substantially fills the cavities between the teeth of the internal gear 42 and the external gear 38 whereby the relative movement of the gears is substantially eliminated and the gears may be regarded as "locked". Under these conditions, the gears rotate about their respective axes at almost the same rotational speed, the small difference resulting from the leakage of oil through the orifice 94 and the clearance spaces between the gears 38 and 42, the flanges 46 and 48, and the eccentric ring 44.

Figure 3A:
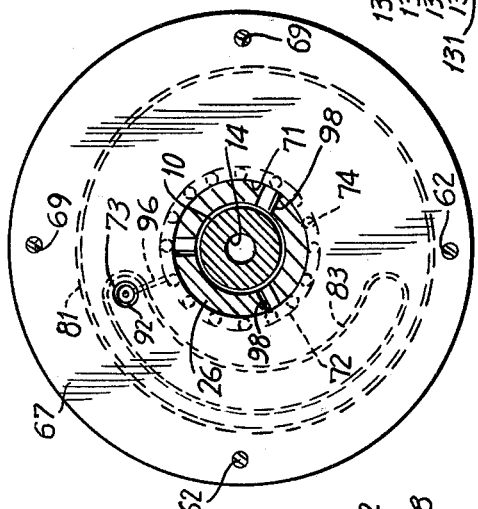
FIG. 3A is a cross-sectional view taken along line 3A—3A of FIG. 2.

It will be appreciated, as pointed out above with respect to FIG. 4, that the pressure in the cavity between the teeth of the gears 38 and 42 is a function of the flow of incompressible fluid through the device. It follows that the leakage of incompressible fluid from the cavity between the faces of the gears also increases with the pressure developed. In order to minimize such leakage losses at higher pressures it may be desirable to interpose a pressure plate 67 between the inner flange 48 and the assembly comprising the eccentric ring 44, the internal gear 42 and the external gear 38. As shown most clearly in FIG. 3A, the pressure plate 67 is circular in shape and is provided with a series of holes 69 to accommodate the bolts 62. A central orifice 71 is also provided through which the stationary shaft 10 and rotatable pulley support 26 may pass. A port 73 is also provided which registers with the outlet port 92 in the inner flange 48. A large diameter O-ring 81 is seated in the inner flange 48 to provide a seal between the inner flange 48 and the pressure plate 67. A second arcuate O-ring 83 is seated in the inner flange 48 adjacent the high pressure region of the pump and surrounding the port 73. It will be understood that the high pressure from the cavity between the teeth of the gears 38 and 42 will be communicated through the port 73 to the region of the pressure plate 67 lying within the seal 83 so as to exert a force urging the pressure plate 67 against the faces of the gears 38 and 42. This force, which opposes the pressure within the cavity, tends to decrease the size of the leakage paths between the gears 38 and 42, the pressure plate 67 and the outer flange 46 and therefore minimizes the leakage losses. While a single pressure plate 67 has been described, it will become apparent from the description below with respect to FIGS. 8 and 9 that a pair of pressure plates, one disposed on each side of the gears 38, 42 may be employed, if desired.

While the mechanism as described up to this point is effective to provide a variable torque (and, hence, a variable speed) drive for an output means, such as a fan, it may happen that relatively sudden changes in oil flow will be reflected as correspondingly rapid changes in output torque which could induce an undesirable shock loading condition on the mechanism. To obviate any such shock loading conditions, it may be desirable to provide an automatic torque controlling feature to the mechanism which will insure that the fan is accelerated gradually to the required operating speed. A modification of the mechanism of FIGS. 1-3 to accomplish this purpose is shown in FIG. 5 and a further modification whereby the torque is limited to a maximum value is shown in FIG. 6.

Figure 5:
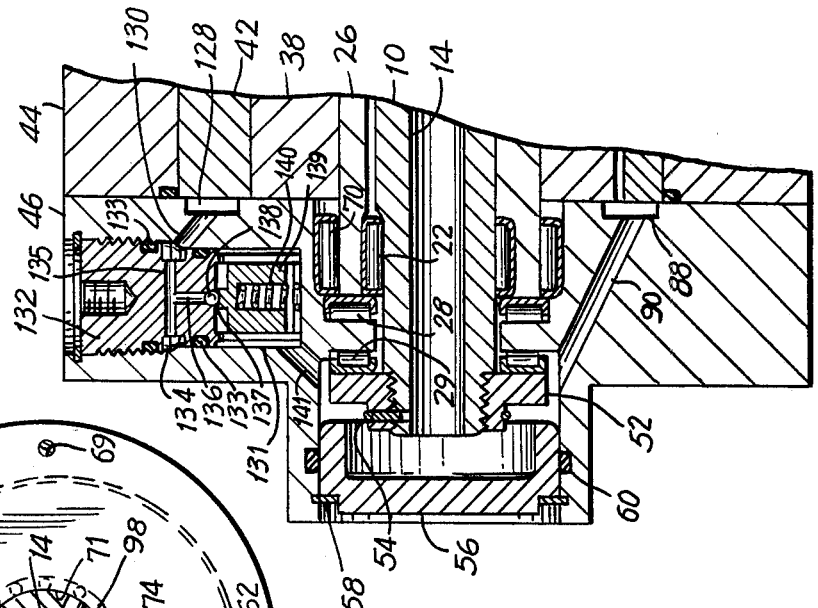
FIG. 5 is a fragmentary view of the device shown in FIG. 2 showing a centrifugally controlled valve designed specifically to control output torque as a function of speed of rotation.
Figure 6:
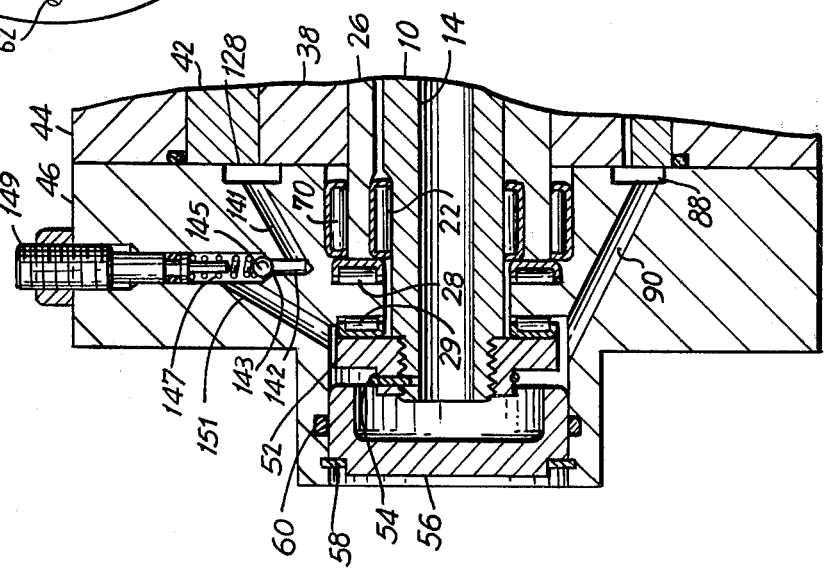
FIG. 6 is a fragmentary view of the device shown in FIG. 2 illustrating a pressure limiting valve installed on the high pressure side of the positive displacement pump designed specifically to limit the output torque of the device.

FIG. 5 is a fragmentary view of the outer or left end portion of the apparatus illustrated in FIG. 2 which shows a torque controlling feature. Elements common to FIGS. 2 and 5 bear the same reference numerals. Referring to FIG. 5, a second high pressure outlet port 128 is provided in the outer flange 46 opposite the outlet port 92 in the inner flange 48. Outlet port 128 communicates through a passageway 130 to a radially disposed cylindrical chamber 131 formed in the outer flange 46 which chamber is closed by a plug 132. O-ring seals 133 are seated in the plug 132 to prevent leakage of high pressure fluid. The plug 132 is formed with an annular groove 134 designed to register with the passageway 130, a diametrical passageway 135 communicating with the annular groove 134, and an axial passageway 136 communicating between the diametrical passageway 135 and a ball check valve seat 137 at the inner end of the plug 132. A ball check valve 138 is maintained against the seat 137 by a mass 139 and a relatively light spring 140. A passageway 141 connects the chamber 131 and the low pressure region within the outer flange 46.

It will be understood that whenever the flow of oil through the mechanism exceeds the minimum quantity that can leak through the orifice 94 without transmitting a substantial torque through the system, the mechanism will transmit torque through the outer flange 46 to the fan 77. The modification shown in FIG. 5 functions to limit that torque to a value slightly greater than the torque required to drive the fan at its then-attained rotational speed. Bearing in mind that when the quantity of oil flowing through the system is sufficient to cause the transmission of some torque the outer flange will rotate, the force of the ball 138 against its seat will be:

$$F = Mr\omega^2 + F_s$$

where M = the combined mass of the ball 138, mass 139 and spring 140
 r = the radius of rotation of the center of mass of the ball, mass and spring
 ω = the angular velocity of the outer flange 46 and
 $F_s$ = the force of the spring.
The pressure P developed by the ball check valve is:

$$P = (F/A)$$

where A is the area of ball valve seat orifice. Since the output torque T is proportional to pressure:

$$KT = P = (F/A)$$

Thus:

$$T = Mr\omega^2/KA = C$$

where:

$$C = F_s/KA$$

Figure 7:
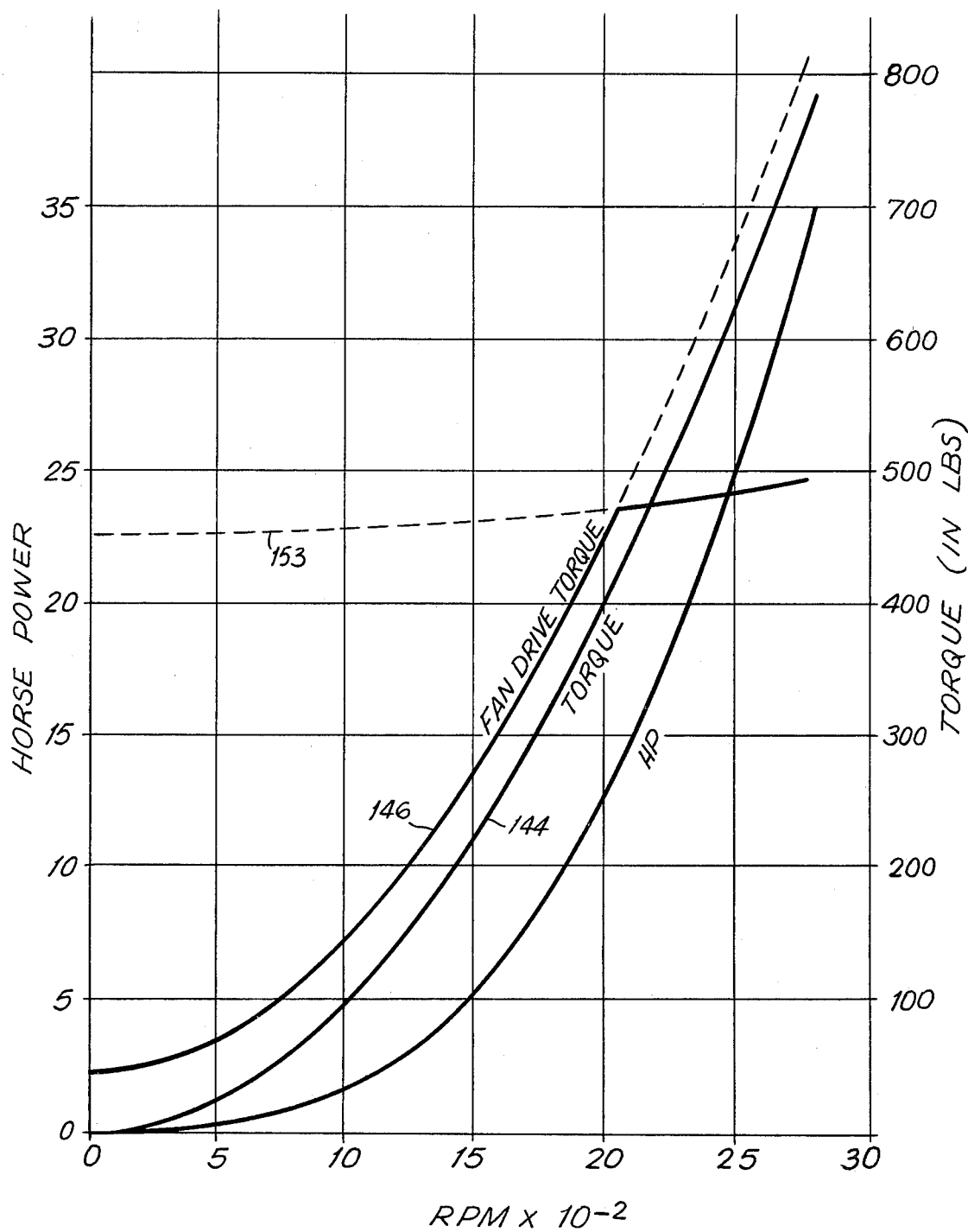
FIG. 7 is a typical graph showing the output torque and horsepower transmitted by the device shown in FIGS. 1-3 utilizing the control valves shown in FIGS. 5 and 6 as a function of engine speed.

It will be appreciated that since the mass of the system, the location of the center of mass, and the spring force are fixed for a given system, the force on the ball is substantially proportional to the square of the rotational speed ($\omega^2$) of outer flange 46. Consequently, the maximum pressure that can be built up at the outlet port 128 will vary with the square of the speed of rotation of the outer flange 46. It is well known that at the rotational speeds relevant here, the torque required to drive a fan is also proportional to the square of the rotational speed of the fan. This is shown in FIG. 7 where the torque required to drive the fan is shown by curve 144. The curve 146 in FIG. 7 represents the maximum torque delivered to the outer flange 46 as limited by the centrifugally controlled check valve device shown in FIG. 5. It will be observed that the torque applied to the fan 77 exceeds the required driving torque by a substantially constant small amount (representing the force due to the spring 140) whereby the fan 77 will be accelerated gradually and uniformly until it attains a rotational speed determined by the flow of oil delivered to the system.

While it is highly desirable to provide a drive in which the applied torque is only slightly greater than the required torque, there may also be situations in which it is desirable to limit the maximum torque which may be transmitted substantially independent of the speed of rotation. A modification to accomplish this purpose is shown in FIG. 6.

FIG. 6 is a fragmentary view of the outer or left end portion of the apparatus illustrated in FIG. 2 which shows a torque limiting feature. Elements common to FIGS. 2, 5 and 6 bear the same reference numerals. Referring to FIG. 6, a second high pressure outlet port 128 is provided in the outer flange 46 opposite the outlet port 92 in the inner flange 48. Outlet port 128 communicates through a passageway 141 with a bore 142 having a seat 143. A ball check valve 145 is urged against the seat 143 by a relatively heavy spring 147, the force of which may be varied by means of the adjusting screw 149. A relief passageway 151 communicates between the region of the bore 142 beyond the ball check valve 145 and the low pressure region within the outer flange 46.

It will be understood that, by eliminating the mass 139 shown in FIG. 5, the pressure which may be built up in the system is determined mainly by the relatively high force exerted by the spring 147 and is substantially independent of the speed of rotation of the system. As illustrated in FIG. 6, for reasons of clarity, the bore 142 is disposed in a radial direction so that centrifugal forces, due to rotation, would tend to unseat the ball 145 and open the valve. It will be understood that the bore 142 may have any desired orientation. If it is disposed tangentially, the effect of the centrifugal forces would be minimized while if the seat 143 were disposed radially outwardly from the ball 145 and spring 147 a relatively small centrifugal force would tend to keep the check valve seated.

Referring to FIG. 7, the curve 153 represents the torque limiting effect of the device of FIG. 6. Since the force on the ball check valve 145 is due principally to the force of the heavy spring 147 the curve 153 is essentially flat. The upward curvature of curve 153 represents, schematically, the construction where the seat 143 and spring 147 are disposed radially outwardly from the ball 145. With the specific construction shown in FIG. 6, the curve 153 would curve downwardly from left to right as shown in FIG. 7. The curve 153 may be viewed as a magnified portion of the curve 146 displaced upwardly as a result of the effect of the greater spring force and smaller inertial force.

It will be appreciated that the torque controlling and torque limiting devices shown in FIGS. 5 and 6 may be used to complement each other. In this circumstance, the drive would first transmit torque to the driven member as indicated by the solid portion of curve 146 (FIG. 7). At the point where the curve 146 intersects the curve 153, the torque would be limited so as to follow the solid portion of curve 153 for all higher speed values.

Figure 9:
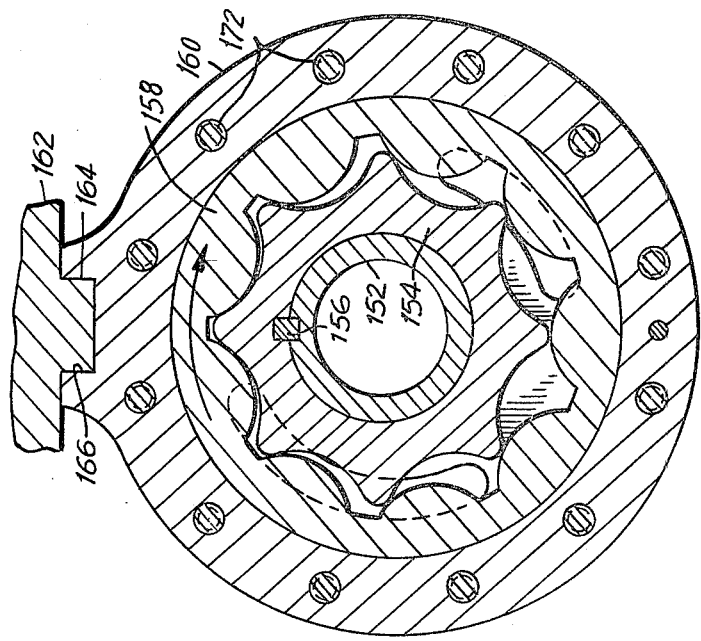
FIG. 9 is a view of the positive displacement pump taken along line 9—9 of FIG. 8.
Figure 8:
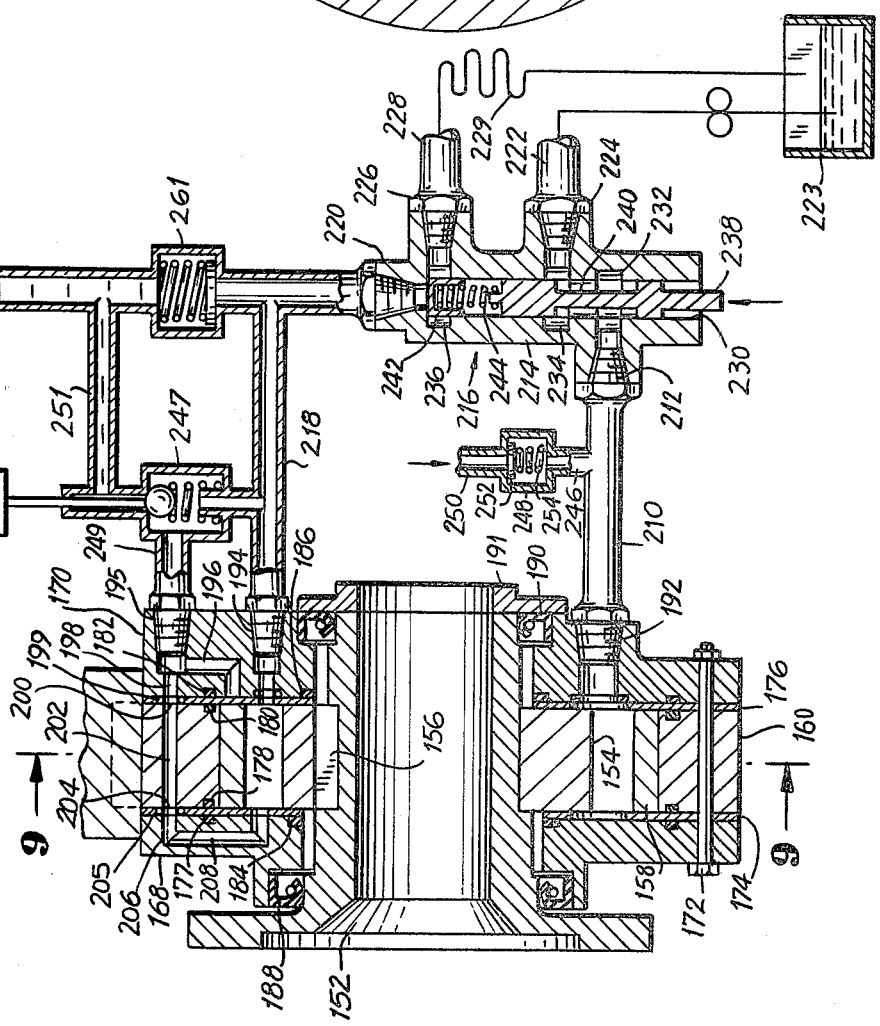
FIG. 8 is a schematic view, partly in section, showing a positive displacement pump having an internal and external gear and an appropriate control valve arrangement to vary the flow of oil through the pump mechanism arranged to function as a brake.

Referring now to FIGS. 8 and 9, an application of the present invention which functions as a braking device is shown. The device of FIGS. 8 and 9 may be applied to a rotating shaft of an engine or other rotating machine or to the drive shaft for a vehicle wheel. Any such rotating shaft is indicated by the reference numeral 152 in FIG. 8. The rotating shaft 152 drives an external gear 154 through a key 156 (FIG. 9). The external gear 154 meshes with an eccentrically mounted internal gear 158 which is journalled for rotation within a ring member 160. As in the previous embodiment, the internal gear 158 is provided with at least one more tooth than the external gear 154. The ring member 160 is restrained from rotation with respect to the vehicle frame 162 by an appropriate means such as a lug 164 on the frame 162 which engages with a slot 166 on the ring 160. An outer flange 168 and an inner flange 170 are fixed to the ring member 160 by a plurality of bolts 172. Preferably, pressure loading plates 174, 176 are interposed respectively between the flanges 168, 170 and the ring member 160. Effective sealing may be accomplished by use of suitable O-rings 177, 178, 180, 182, 184 and 186 fitted into the flanges 168, 170 and the ring member 160 so as to seal against the pressure plates 174, 176. In addition sealing elements 188, 190 are provided to seal the flanges 168 and 170, respectively, and the rotating shaft 152. A cover 191 may be provided to secure the seal 190 in the inner flange 170.

A low pressure inlet port 192 is formed in the inner flange 170 in the locus of the path of the teeth of the internal gear 158. A high pressure outlet port 194 is formed in the inner flange 170 opposite the inlet port 192. A pressure plate port 195 is formed in the inner flange 170 which port communicates with a radial passageway 196 and an axial passageway 198. The passageway 198 is aligned with a port 200 in the pressure plate 176, an axial bore 202 in the ring member 160, a port 204 in the pressure plate 174 and an axial bore 206 in the outer flange 168 which, in turn, communicates with a radial passageway 208 in the outer flange 168. O-ring seals 199 and 205 are located in the ports 200 and 204 respectively of the pressure plates 176 and 174. It will be understood that fluid pressure applied through the port 195 will be conducted through the passageways and ports referred to above to the outer surfaces of the pressure plates 174, 176 lying between the seals 177 and 184 (for plate 174) and between the seals 182 and 186 (for plate 176) thereby urging the pressure plates 174, 176 against the faces of the external gear 154 and the internal gear 158 to counteract the pressure generated in the gear elements and to maintain a close clearance at the gear faces.

A duct 210 communicates between the inlet port 192 and a first port 212 in the body 214 of the control valve 216 while a second duct 218 communicates between the outlet port 194 and a second port 220 located at one end of the body 214 of the control valve 216. Low pressure oil is introduced into the control valve 216 through a third duct 222 which communicates between a sump 223, for example, the engine crankcase and a third port 224 in the body 214. High pressure oil is exhausted from the control valve 216 from a fourth port 226 and a fourth duct 228 which communicates between the control valve 216 and an oil heat exchanger 229. After passing through the heat exchanger 229, the oil is returned to the sump 223. While a separate oil cooler, and sump have been shown and described, the oil cooler may be omitted depending upon the amount of heat required to be dissipated, the quantity of oil in the system, and the location of the sump. Also, the oil cooler may be omitted if an adequate oil cooler has been otherwise provided for the sump.

An axial bore 230 is formed through the control valve body 214. The bore 230 communicates directly with the second port 220 and via annular cavities 232, 234, 236 with the first, third and fourth ports 212, 224 and 226 respectively. An axially movable control spool 238 having a centrally disposed annular groove 240 is located in the axial bore 230 of the valve body 214. A pressure control piston 242 is disposed for axial movement within the axial bore 230 of the control valve body 214 with one end face adjacent the opening of the port 220 within the control valve body 214. One end of a compression spring 244 urges the pressure control piston 242 against the port 220 to inhibit the flow of high pressure oil from the port 220 into the cavity 236 and thence to the port 226 while the opposite end of the compression spring 244 is seated against the end of the control spool 238. A branch duct 246 communicates between the duct 210 and an air relief valve 248. The air relief valve 248 is provided with an inlet port 250 which is normally closed by a plate closure 252 biased against the inlet port 250 by a compression spring 254.

The pressure port 195 communicates with a three-way solenoid valve 247 through a duct 249. The solenoid valve 247 also is connected between the high pressure duct 218 and an accumulator 257 through the duct 251. Finally, a check valve 261 is connected in parallel with the solenoid valve 247 between ducts 218 and 251. It will be understood that any type of three-way valve may be used in place of the solenoid valve 247 and that the three-way valve may be manually or remotely controlled. Moreover, a pair of two-way valves may be substituted for the equivalent three-way valve.

The operation of the brake device shown in FIGS. 8 and 9 is as follows: When the control spool 238 is moved upwardly as shown in FIG. 8, low pressure oil is introduced from the duct 222 through the port 224, the groove 240, the cavity 232, the port 212 and the duct 210 to the inlet port 192 of the positive displacement gear pump. As the quantity of oil introduced into the gear pump increases, the pressure between the teeth of the external gear 154 and the internal gear 158 increases as does the torque transmitted to the ring member 160. As the ring member 160 is fixed against rotation, the transmitted torque reacts against the external gear 154 to inhibit rotation thereof together with the rotating shaft 152 to which it is keyed. As hydraulic pressure is developed at the outlet port 194, oil tends to flow through the duct 218 and the port 220 thereby exerting a force against the control piston 242. The oil also flows through the check valve 261 to establish a pressure in the accumulator 257 substantially equal to the outlet pressure. The outlet pressure is limited by the force of the compression spring 244 which biases the control piston 242 towards the closed position. It will be understood that the force exerted by the compression spring 244 controls the pressure within the gear pump system and therefore the braking torque which may be applied to the rotating shaft 152. The force of the compression spring 244 is, in turn, determined by the position of the control spool 238. Thus, as the control spool 238 is moved axially upward (as shown in FIG. 8), the braking torque is increased until the internal gear 158 and the external gear 154 become hydraulically locked as hereinbefore described.

Conversely, as the control spool 238 is moved axially downwardly (as viewed in FIG. 8) the braking torque will be decreased as a result of the decreasing force exerted by the compression spring 244. Ultimately, continued downward movement of the control spool 238 will interrupt the flow of oil between the ports 224 and 212 when the annular groove 240 passes beyond the annular cavity 234. When the pressure in the duct 210 falls below atmospheric pressure, the air relief valve 248 will open and permit the flow of air into the duct 210. Under these conditions, the braking torque developed by the action of the positive displacement gear pump will be reduced essentially to zero. It will be understood that during normal operation, high pressure fluid from the outlet port 194 passes through the three-way solenoid valve 247 and the pressure port 195 so as to urge the pressure plates 174 and 176 against the faces of the gears 154 and 158, thereby minimizing leakage losses.

While the braking device in accordance with the present invention, as described above, is intended for use during operation of a vehicle or rotating machine when the shaft 152 is rotating, it may also be used as a "parking" or "emergency" brake when the shaft 152 is at rest and it is desired to maintain the shaft in a stationary position. To accomplish this result, the three-way solenoid valve 247 is opened to the accumulator 257 and closed to the duct 218. Under these conditions, the fluid pressure from the accumulator 257 is communicated to the pressure plates 174 and 176 from the pressure port 195 and the aforementioned passageways, ducts, ports or bores 196, 198, 200, 202, 204, 206 and 208. The pressure plates 174 and 176 are thereby urged against the opposing faces of the external gear 154 and the internal gear 158 inhibiting the relative rotation thereof.

Figure 11:
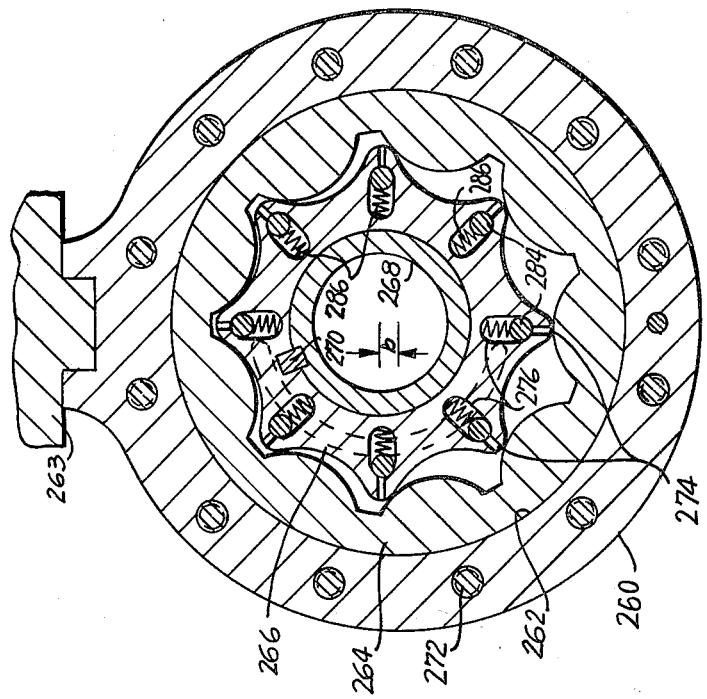
FIG. 11 is a cross-sectional view of the positive displacement pump taken along line 11—11 of FIG. 10.
Figure 10:
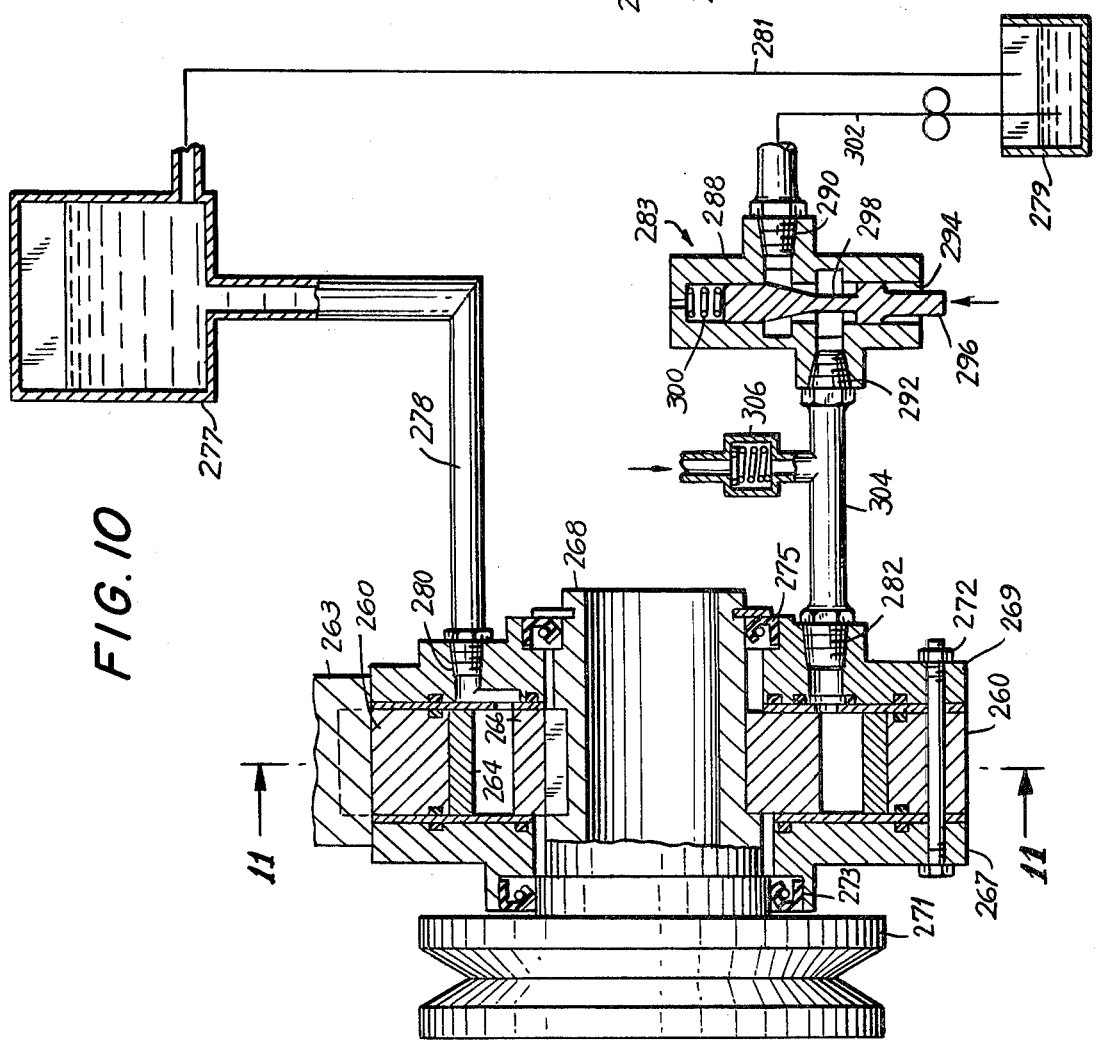
FIG. 10 is a schematic view partly in section, showing a positive displacement pump having an internal and external gear and check valve means together with flow control and sump means designed to deliver a variable quantity of incompressible fluid to a system at a predetermined pressure.

Reference is now made to FIGS. 10 and 11 which illustrate the concept of the present invention applied to a system wherein it is desired to supply a variable quantity of an incompressible fluid at a predetermined pressure. A fixed housing 260 having a cylindrical bore 262 is provided. Convenient means for preventing motion of the housing 260 is indicated schematically on FIG. 11 by the numeral 263. An internal gear 264 is journalled for free rotation within the bore 262 of the housing 260. An external gear 266 having at least one less tooth than the internal gear 264 is positioned for rotation about an axis offset a distance "b" from the axis of rotation of the internal gear 264 so as to form a positive displacement pump. Such positioning is accomplished by securing the external gear 266 to a drive shaft 268 by a key 270 and journalling the drive shaft in side flanges 267, 269 which are secured to the fixed housing 260 by a plurality of bolts 272. A driving member 271 which may, for example, be a pulley or a gear is fixed to one end of the drive shaft 268 and driven from an appropriate source of power (not shown). Appropriate seals 273, 275 are mounted in the flanges 267, 269, respectively, to seal the opening between the rotating drive shaft 268 and the stationary flanges 267, 269. It will be understood that the side flanges 267, 269 are similar to the flanges 168, 170 shown in FIG. 8. The flange 269 contains an inlet port 282 and an arcuate chamber 280 which communicate respectively with the maximum and minimum cavities defined by the mating teeth of the eccentrically positioned external gear 266 and internal gear 264. It will be understood that appropriate sealing means, such as O-rings, may be located between the fixed housing and flanges as has been described above with respect to FIG. 8 and that, if desired, pressure plates and their associated passageways may be provided as also described above with respect to FIG. 8.

As shown in FIG. 11, an outlet port 274 is formed in the tip of each tooth of the external gear 266 which communicates with an elongated axial bore 276 also formed in the teeth of the external gear 266. The elongated axial bore 276 communicates with the arcuate chamber 280 formed in the flange 269. Cylindrical check valves 284 are located in each of the axial bores 276 and are biased towards a normally closed position against the ports 274 by centrifugal force. If desired, spring means 286 may be used to provide a constant and supplemental bias for the check valves 284.

Similar to the configuration shown in FIGS. 1-3 and FIGS. 8 and 9, as the external gear 266 and the internal gear 264 are driven about their respective offset axes, the the cavity formed between their respective teeth varies in volume from a maximum adjacent the inlet port 282 to a minimum adjacent the chamber 280 and thence back to a maximum with continued rotation from the chamber 280 to the inlet port 282.

The chamber 280 communicates to a system 277 through an outlet duct 278. The system 277 may be any system requiring variable quantities of an incompressible fluid at a predetermined pressure and represents the desired end use of the variable flow pump of the present invention. For example, the system 277 might comprise a manifold to provide lubricating oil to the bearings of rotating machines where the amount of oil required varies with the number of machines in operation. Or the system 277 might comprise a turbine requiring a variable supply of fuel at constant pressure. It is thus apparent that the system 277 may consume the pressurized fluid or may return the fluid to a low pressure sump 279 via duct 281.

A flow control valve 283 is located between the low pressure sump 279 and the inlet port 282 of the pump. The flow control valve 283 comprises a body 288 having an inlet port 290, an outlet port 292 and an axial cavity 294 extending from one end of the valve body 288 and communicating with the inlet port 290 and outlet port 292. An axially movable control spool 296 is positioned within the valve body 288. The control spool 296 includes a reduced central portion 298 comprising a tapered section and a cylindrical section and may be biased to a closed position by a spring 300. It will be understood that as the control spool is moved upwardly from its extreme downward position (as viewed in FIG. 10) the control valve 283 is gradually opened whereby the flow through the control valve is a function of the position of the control spool 296. The inlet port 290 of the control valve 283 communicates with the low pressure sump 279 through a duct 302 while the outlet port 292 of the control valve communicates with the inlet port 282 of the pump through a duct 304. A check valve 306 is connected to the duct 304 to permit air to flow into the duct 304 when the pump is in operation but the flow control valve is set to deliver a smaller volume of fluid than is required to fill the positive displacement pump. It will, of course, be understood that the check valve 306 may be incorporated into the flow control valve body 288, if desired.

If the pump as shown in FIGS. 10 and 11 is operated with only a compressible fluid, such as air, and with the chamber 280 closed, very little energy will be consumed since the energy required to compress the fluid will be recovered during the expansion portion of the cycle. If, on the other hand, an incompressible fluid is employed, the incompressible fluid will be delivered through the outlet ports 274, the bores 276, and the chamber 280, the check valves 284 opening in response to the increased pressure. Thus, the pump of the present invention can function as a normal positive displacement pump.

However, in addition to the usual no-flow and full-flow modes, the pump of the present invention is also adapted to operate as a variable displacement pump at the desired outlet pressure, as will now be described, by supplying a mixture of compressible and incompressible fluids to the inlet port 282. If the maximum volume of the cavity is equal to "A" units and the minimum volume of the cavity is "B" units and the portion of the volume occupied by the incompressible fluid is designated by the subscript 1 while the portion of the volume occupied by the compressible fluid is designated by the subscript 2, then $B_1$, represents the volume of the incompressible fluid at the minimum displacement position. The volume $B_1$, plus the volume discharged, if any, then equals $A_1$. If the pressure $P_B$ is less than the desired output pressure determined by the demand of the system 277, no fluid will be discharged, and no net work will be done since the work done to compress the compressible fluid will be recovered. On the next revolution, additional incompressible fluid will be introduced thereby reducing the volume of the compressible fluid. This will have the effect of increasing the outlet pressure. Within a very few revolutions, the outlet pressure will rise to a point where the check valves open and discharge a portion of the incompressible fluid. The incompressible fluid is preferentially discharged because, due to its higher density and the centrifugal forces developed within the pump, the incompressible fluid will occupy the outermost portions of the cavity which are adjacent to the outlet ports 274 leading to the chamber 280. The amount of incompressible fluid discharged at the pressure demanded by the system 277 will be equal to the amount of incompressible fluid introduced at the inlet. Thus, within the capacity of the pump, any desired output volume may be obtained at the pressure demanded at the outlet by the system 277 connected thereto. The variable output capacity results from the fact that the arcuate chamber 280 communicates with a plurality of cavities. At low output flows, the flow occurs only from a single cavity but as additional flow is required, the flow will come from several cavities simultaneously. However, the net energy used is directly proportional to the quantity of incompressible fluid delivered at the pressure demanded by the system 277 and therefore the pump of the present invention is well adapted for applications where the required quantity of an incompressible fluid, such as oil may vary, or, conversely, although the oil requirements may be relatively constant, the speed of the pump may be varied. In either event, the pump of the present invention can supply the requisite quantity of fluid at the desired pressure without the expenditure of excess or unutilized pumping energy.

It will be understood that if the drive member 271 of the pump is driven at a constant speed, the flow through the pump will vary directly with the setting of the control spool 296 of the control valve 283. On the other hand, the flow through the pump will also vary with the speed of the pump for a given control valve setting. Thus, the output of the pump may be controlled by varying the pump speed or the flow control valve setting or both. It will be apparent that automatic control means may be utilized so that the pump may be operated from a remote station in response to a signal from the system 277 to which the pump is connected.

Figure 12:
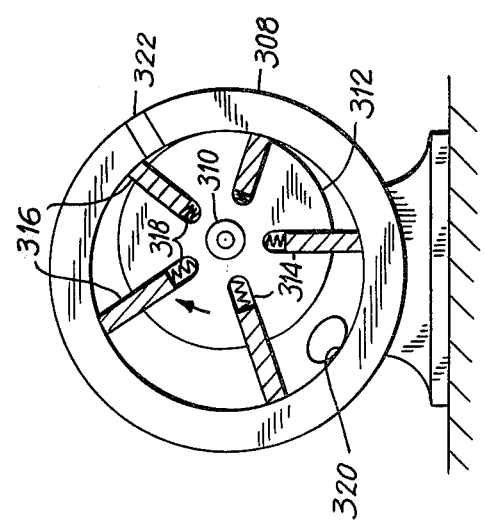
FIG. 12 is a cross-sectional view of a positive displacement pump of the vane type which also may be used in practicing the present invention.

The present invention has, for simplicity and clarity, been described with reference to a positive displacement pump mechanism having an internal gear which meshes with an external gear. An important characteristic of such a pump is the ability to recover the energy expended in compressing a compressible fluid. Certain other types of positive displacement pumps manifest this same characteristic and, thus, may be employed in the present invention. FIG. 12 is a cross-sectional view of a positive displacement vane pump having a body 308 formed with a cylindrical inner surface. A shaft 310 offset from the axis of the inner surface of the pump body 308 carries a rotor 312. A plurality of radial slots 314 are equiangularly disposed around the circumferential surface of the rotor 312 to receive movable vanes 316. The vanes may be urged outwardly against the inner surface of the pump body 308 by appropriate spring means 318. A low pressure inlet port 320 is located in the region where the cavity formed by the pump body 308, rotor 312 and vanes 316 is of maximum size while a high pressure outlet port 322 is positioned in the region where the cavity is of minimum size. It will be understood that the vane pump of FIG. 12 may be substituted for the gear pumps shown in FIGS. 2, 3, 8, 9, 10 and 11.

Figure 13:
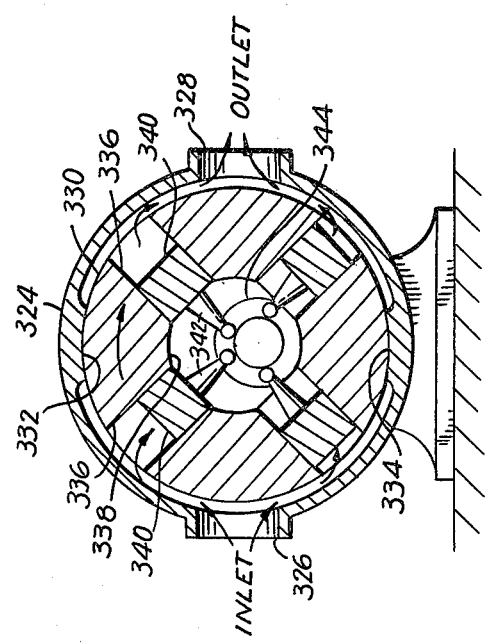
FIG. 13 is a cross-sectional view of a positive displacement pump of the piston type which may be used in practicing the present invention.

FIG. 13 illustrates another form of a positive displacement pump which can be employed in the practice of the present invention, in this instance a piston-type pump. The pump comprises a cylindrical body 324 having an inlet port 326 and an outlet port 328. A cylindrical rotor 330 is journalled for rotation within the body 324 about an axis concentric with that of the body 324. A pair of axial ribs 332, 334 mounted within the pump body 324 to maintain sliding contact with the rotor 330 separate the high and low pressure regions of the pump. A plurality of radially disposed cylinders 336 are formed in the rotor 330 and communicate with an axial bore 338 also formed within the rotor 330. Each cylinder 336 is fitted with a piston 340. Connecting rods 342 are rigidly affixed at one end to the pistons 340, the opposite ends being constrained by a circular track 344 offset from the axis of the rotor 330. It will be appreciated that rotation of the rotor 330 will cause the pistons 340 to be reciprocated within the cylinders 336 so as to provide a low pressure regions adjacent the inlet port 326 and a high pressure region adjacent the outlet port 328. The positive displacement pump shown in FIG. 13 may be substituted for the gear pumps shown in FIGS. 2, 3, 8, 9, 10 and 11 or the vane pump shown in FIG. 12.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. An apparatus comprising a first member, a second member, positive displacement pump means capable of doing work on a compressible fluid and recovering substantially all of such work during an expansion cycle and having an inlet port and an outlet port and interconnecting said first member and said second member, said positive displacement pump being adapted to pump a compressible fluid, an incompressible fluid and a mixture of a compressible fluid and an incompressible fluid, flow control means, duct means communicating between said flow control means and said inlet port of said positive displacement pump means, pressure control means communicating with said outlet port of said positive displacement pump means, and sump means containing an incompressible fluid and communicating with said flow control means.

2. An apparatus as described in claim 1 in which said first member is a drive member, said second member is a driven member, and said positive displacement pump means comprises a rotatable internal gear and an external gear having at least one less tooth than said internal gear, said external gear being rotatable about an axis offset from the axis of rotation of said internal gear.

3. An apparatus as described in claim 2 in which said flow control means comprises a fluid flow valve actuated by a thermostatic element.

4. An apparatus as described in claim 3 in which said drive member and said driven member are rotatable.

5. An apparatus as described in claim 4 in which said pressure control means comprises a restricted orifice.

6. An apparatus as described in claim 5 and comprising, in addition, at least one pressure plate having a first side disposed against the faces of said internal and external gears, said pressure plate having a port formed therein in register with said outlet port of said positive displacement pump means and seal means disposed against a second side of said pressure plate and surrounding said port formed therein opposite the high pressure region within said positive displacement pump whereby the pressure on opposite sides of said pressure plate is substantially balanced.

7. An apparatus as described in claim 1 and comprising, in addition, a second outlet port in said positive displacement pump means and pressure relief means communicating between said second outlet port in said positive displacement pump means and said duct means.

8. An apparatus as described in claim 7 in which the pressure relief means comprises a spring-loaded ball check valve.

9. An apparatus as described in claim 7 and comprising, in addition, at least one pressure plate having a first side disposed against the faces of said internal and external gears, said pressure plate having a port formed therein in register with said outlet port of said positive displacement pump means and seal means disposed against a second side of said pressure plate and surrounding said port formed therein opposite the high pressure region within said positive displacement pump whereby the pressure on opposite sides of said pressure plate is substantially balanced.

10. An apparatus as described in claim 1 and comprising, in addition, a second outlet port in said positive displacement pump means and centrifugal pressure controlling means communicating between said second outlet port in said positive displacement pump means and said duct means.

11. An apparatus as described in claim 10 in which the pressure controlling means comprises a mass located in said second member and movable radially with respect thereto.

12. An apparatus as described in claim 10 and comprising, in addition, at least one pressure plate having a first side disposed against the faces of said internal and external gears, said pressure plate having a port formed therein in register with said outlet port of said positive displacement pump means and seal means disposed against a second side of said pressure plate and surrounding said port formed therein opposite the high pressure region within said positive displacement pump whereby the pressure on opposite sides of said pressure plate is substantially balanced.

13. An apparatus as described in claim 2 and comprising, in addition, a second outlet port in said positive displacement pump means, and pressure relief means communicating between said second outlet port in said positive displacement pump means and said duct means.

14. An apparatus as described in claim 3 and comprising, in addition, a second outlet port in said positive displacement pump means, and pressure relief means communicating between said second outlet port in said positive displacement pump means and said duct means.

15. An apparatus as described in claim 4 and comprising, in addition, a second outlet port in said positive displacement pump means, and pressure relief means communicating between said second outlet port in said positive displacement pump means and said duct means.

16. An apparatus as described in claim 5 and comprising, in addition, a second outlet port in said positive displacement pump means, and pressure relief means communicating between said second outlet port in said positive displacement pump means and said duct means.

17. An apparatus as described in claim 16 and comprising, in addition, at least one pressure plate having a first side disposed against the faces of said internal and external gears, said pressure plate having a port formed therein in register with said outlet port of said positive displacement pump means and seal means disposed against a second side of said pressure plate and surrounding said port formed therein opposite the high pressure region within said positive displacement pump whereby the pressure on opposite sides of said pressure plate is substantially balanced.

18. An apparatus as described in claim 2 and comprising, in addition, a second outlet port in said positive displacement pump means and centrifugal pressure controlling means communicating between said second outlet port in said positive displacement pump means and said duct means.

19. An apparatus as described in claim 3 and comprising, in addition, a second outlet port in said positive displacement pump means and centrifugal pressure controlling means communicating between said second outlet port in said positive displacement pump means and said duct means.

20. An apparatus as described in claim 4 and comprising, in addition, a second outlet port in said positive displacement pump means and centrifugal pressure controlling means communicating between said second outlet port in said positive displacement pump means and said duct means.

21. An apparatus as described in claim 5 and comprising, in addition, a second outlet port in said positive displacement pump means and centrifugal pressure controlling means communicating between said second outlet port in said positive displacement pump means and said duct means.

22. An apparatus as described in claim 21 and comprising, in addition, at least one pressure plate having a first side disposed against the faces of said internal and external gears, said pressure plate having a port formed therein in register with said outlet port of said positive displacement pump means and seal means disposed against a second side of said pressure plate and surrounding said port formed therein opposite the high pressure region within said positive displacement pump whereby the pressure on opposite sides of said pressure plate is substantially balanced.

23. An apparatus as described in claim 5 and comprising, in addition, a second outlet port in said positive displacement pump means, pressure relief means communicating between said second outlet port and said duct means, and centrifugal pressure controlling means communicating between said second outlet port and said duct means.

24. An apparatus comprising a rotatable drive member, a non-rotatable driven member, positive displacement pump means capable of doing work on a compressible fluid and recovering substantially all of such work during an expansion cycle and having an inlet port and an outlet port and interconnecting said rotatable drive member and said non-rotatable driven member, said positive displacement pump being adapted to pump a compressible fluid, an incompressible fluid and a mixture of a compressible fluid and an incompressible fluid, incompressible fluid flow control means including adjustable valve means, first duct means communicating between said flow control means and said inlet port of said positive displacement pump means, pressure control means communicating with said outlet port of said positive displacement pump means, sump means containing an incompressible fluid, second duct means communicating between said pressure control means and said sump means, third duct means communicating between said sump means and said flow control means, spring means interconnecting said adjustable valve means and pressure control means and biasing said pressure control means, and check valve means communicating with said first duct means.

25. An apparatus as described in claim 24 in which said positive displacement pump means comprises a rotatable internal gear and an external gear having at least one less tooth than said internal gear, said external gear being rotatable about an axis offset from the axis of rotation of said internal gear.

26. An apparatus as described in claim 25 in which said positive displacement pump additionally includes at least one pressure plate having a first side disposed adjacent the faces of said internal and external gears, a third port, passageways formed in said positive displacement pump communicating between said third port of said positive displacement pump and the second side of said pressure plate, fourth duct means communicating between said third port and said outlet port whereby pressurized fluid may be applied through said fourth duct means and said passageways to urge said pressure plate into frictional engagement with the faces of said internal and external gears.

27. An apparatus as described in claim 26 and comprising, in addition, accumulator means, check valve means and three-way valve means, said outlet port communicating with said accumulator means through said check valve means, said third port communicating through said three-way valve means with said outlet port and said accumulator.

28. An apparatus as described in claim 27 in which the three-way valve is a solenoid actuated valve.

29. An apparatus for delivering a variable quantity of incompressible fluid at a predetermined pressure comprising a drive member, a driven member, positive displacement pump means capable of doing work on a compressible fluid and recovering substantially all of such work during an expansion cycle and having inlet and outlet ports and interconnecting said drive member and said driven member, said positive displacement pump being adapted to pump a compressible fluid, and incompressible fluid and a mixture of a compressible fluid and an incompressible fluid, pressure control means communicating with said outlet port of said positive displacement pump, flow control means adapted to control the flow of low pressure incompressible fluid, first duct means communicating between said flow control means and said inlet port of said positive displacement pump means, check valve means communicating with said first duct means, sump means containing an incompressible fluid, and second duct means communicating between said flow control means and said sump means.

30. An apparatus as described in claim 29 in which said positive displacement pump means comprises a rotatable internal gear and an external gear having one less tooth than said internal gear, said external gear being rotatable about an axis offset from the axis of rotation of said internal gear.

31. An apparatus as described in claim 30 in which each of the teeth of the external gear has formed therein an axial bore extending radially along the tooth, a radial port communicating between said axial bore and the tip of each of said teeth, said positive displacement pump having a chamber communicating with said axial bore, a check valve member disposed within said axial bore of each of said teeth, whereby incompressible fluid at a predetermined pressure may be delivered through said radial ports and said axial bores to said chamber of said positive displacement pump.

32. An apparatus as described in claim 31 in which the chamber of said positive displacement pump extends circumferentially so as to communicate with a plurality of said axial bores.

33. An apparatus as described in claim 31 and comprising, in addition, spring means biasing each of said check valve members against each of said radial ports.

34. An apparatus as described in claim 33 in which the chamber of said positive displacement pump extends circumferentially so as to communicate with a plurality of said axial bores.

35. An apparatus as described in claim 31 in which the check valve members are cylindrical.

36. An apparatus as described in claim 35 and comprising, in addition, spring means biasing each of said check valve members against each of said radial ports.

37. An apparatus as described in claim 36 in which the chamber of said positive displacement pump extends circumferentially so as to communicate with a plurality of said axial bores.

* * * * *